United States Patent
Brunner

(10) Patent No.: US 10,127,748 B2
(45) Date of Patent: Nov. 13, 2018

(54) SYSTEM HAVING A MOBILE KEY UNIT

(71) Applicant: SICK AG, Waldkirch (DE)

(72) Inventor: Fabio Brunner, Waldkirch (DE)

(73) Assignee: SICK AG, Waldkirch (DE)

( * ) Notice: Subject to any disclaimer, the term of this patent is extended or adjusted under 35 U.S.C. 154(b) by 11 days.

(21) Appl. No.: 15/446,278

(22) Filed: Mar. 1, 2017

(65) Prior Publication Data

US 2017/0270724 A1    Sep. 21, 2017

(30) Foreign Application Priority Data

Mar. 16, 2016    (EP) .................................... 16160571

(51) Int. Cl.
*G07C 9/00*      (2006.01)
*G06K 19/07*    (2006.01)
(Continued)

(52) U.S. Cl.
CPC ............ *G07C 9/00119* (2013.01); *F16P 3/08* (2013.01); *F16P 3/147* (2013.01);
(Continued)

(58) Field of Classification Search
CPC .... G06F 21/31; G06Q 20/102; G06Q 20/227; G06Q 20/3433; G06Q 20/349;
(Continued)

(56) References Cited

U.S. PATENT DOCUMENTS 8,875,235 B1 * 10/2014 Hakimian ............... H04L 63/08
                                                                726/2
2009/0102655 A1 * 4/2009 Yi .......................... H04L 63/083
                                                                340/572.1
(Continued)

FOREIGN PATENT DOCUMENTS

DE    202004007343 U1    9/2004
DE    102010011766 A1    9/2011
WO        03025834 A1    3/2003

OTHER PUBLICATIONS

European Search Report dated Sep. 19, 2016 in corresponding European Application No. 16160571.2.

*Primary Examiner* — Dionne H Pendleton
(74) *Attorney, Agent, or Firm* — Nath, Goldberg & Meyer; Jerald L. Meyer

(57) ABSTRACT

A system having a mobile key unit (2) for reading and writing data from at least one external device (3) of a facility (4), wherein the data at least comprise identification data for the device (3) to be checked, and wherein the mobile key unit (2) has a first transmission/reception unit (5) by means of which the data can be transmitted wirelessly between the device (3) and the key unit (2), wherein the key unit (2) has a first memory (6), the key unit (2) has at least one secure channel (7) having a first evaluation unit (8) and the first transmission/reception unit (5) and has at least one second channel (12) having a second evaluation unit (13) and a second transmission/reception unit (10) by means of which data can be wirelessly transferred between the device (3) and the key device (2), wherein the data can at least be transmitted using one of the transmission/reception units.

7 Claims, 2 Drawing Sheets

Figure 1:
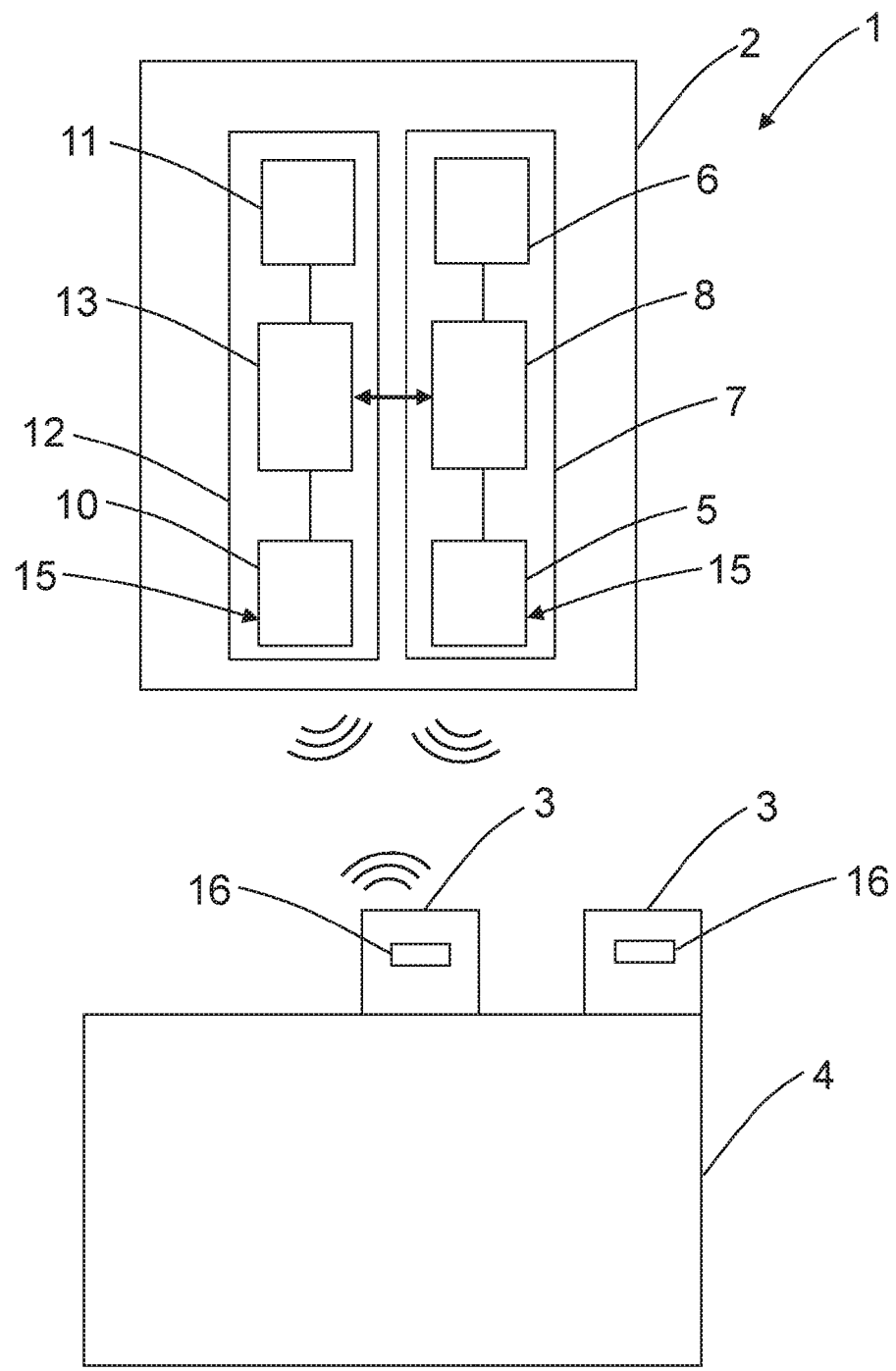

(51) Int. Cl.
*G06K 7/10* (2006.01)
*G07C 3/00* (2006.01)
*F16P 3/08* (2006.01)
*F16P 3/14* (2006.01)

(52) U.S. Cl.
CPC ..... *G06K 7/10376* (2013.01); *G06K 7/10415* (2013.01); *G06K 19/0723* (2013.01); *G06K 19/0727* (2013.01); *G07C 3/00* (2013.01); *G07C 9/00904* (2013.01); *G07C 2009/00507* (2013.01); *G07C 2009/00769* (2013.01)

(58) Field of Classification Search
CPC ........... G06Q 20/3552; G06Q 20/3572; G06Q 40/02; G08B 13/2417; G08B 13/2448; G08B 13/2482; H04L 63/0407; H04L 63/08; H04L 63/083; H04W 12/02; H04W 4/70; G07C 9/00904; G07C 3/00; G07C 2009/00769; G06K 7/10376; G06K 19/0727; G06K 19/0723
See application file for complete search history.

(56) References Cited

U.S. PATENT DOCUMENTS

| | | | |
|---|---|---|---|
| 2013/0257617 A1* | 10/2013 | Alicot | G08B 13/2482 340/572.1 |
| 2015/0156176 A1* | 6/2015 | Collinge | H04L 63/0428 713/168 |
| 2015/0194001 A1* | 7/2015 | Naghi | G07C 9/00134 340/568.1 |
| 2017/0178111 A1* | 6/2017 | Roberts | G06Q 20/102 |
| 2018/0089656 A1* | 3/2018 | Jones | G06Q 20/202 |

* cited by examiner

SYSTEM HAVING A MOBILE KEY UNIT

The present invention relates to a system having a mobile key unit for reading and writing data in accordance with the preamble of claim 1.

DE 10 2010 011 766 A1 discloses a monitoring device for at least one state having s transponder, a receiver and an evaluation circuit.

It is an object of the invention to provide an improved system having a mobile key unit for reading and writing data. It is a further object to provide more versatile possibilities of use for the key unit and to enable the use in safety-directed devices.

The object is satisfied in accordance with claim 1 by a system having a mobile key unit for reading and writing data from at least one external device of a system, wherein the data at least comprise identification data for the device to be checked, and wherein the mobile key unit has a first transmission/reception unit by means of which the data can be wirelessly transmitted between the device and the key unit, wherein the key unit has a first memory, the key unit has at least one first secure channel having a first evaluation unit and the first transmission/reception unit, and has at least one second channel having a second evaluation unit and a second transmission/reception unit by means of which data can be transmitted wirelessly between the device and the key unit, wherein the data can be transmitted using at least one of the transmission/reception units.

The system can, for example, be a safety system, for example a safety system in accordance with machine security, for example in accordance with the standard EN/ISO 1384-1 or with the standard EN/IEC 62061 that, for example, provides the framework for functional safety of safety-related electronic control systems and their subsystems at machines.

The first secure channel having the first evaluation unit can have self-checking structures, for example. The first evaluation unit has a two-channel structure, for example, and the channels check one another.

The key unit in accordance with the invention can have a very simple configuration. It is, for example, a handy key unit that can be carried or taken along by a person without problem. The key unit optionally has operating elements and optionally at least one display element.

The key unit further has the evaluation units. The evaluation units are formed by a microcontroller, for example. The key unit furthermore has the memory to store data on the key unit. A second memory is optionally provided that is connected to the second evaluation unit. It is thereby possible to store data redundantly and to compare the data with one another.

The first evaluation unit and the second evaluation unit can optionally form a two-channel evaluation unit, with an interface being provided between the evaluation units to carry out a cross-comparison of data between the evaluation units. Security of the key unit can thereby be increased.

The facility can, for example, be an industrial facility for manufacturing products. It is, for example, in this respect a part of a production plant for automobiles. The facility can also be a part of a machine or a facility having a plurality of machines. The facility has a safety zone that may not be entered by persons when the facility is active since the person may be in danger from parts of the facility. The facility is formed, for example, one or more robots whose dangerous action zone is disposed within the safety zone.

The at least one external device is arranged, for example, within the safety zone. The device or devices are, for example, arranged at a fixed position so that they cannot be removed. They can, however, also be mobile devices. The device is integrated in the facility, for example.

The device at least includes data for identification that can be accessed wirelessly from the key unit via the first transmission/reception unit or via the second transmission/reception unit. The first transmission/reception unit or the second transmission/reception unit is preferably a radio transmission/reception unit.

The device can, for example, be a valve, an actuator, a sensor or another electrical or electronic device.

A first kind of respective data that will be explained by way of example in the following is preferably transmitted using the first transmission/reception unit.

These data can, for example, be control data for the device that are transmitted to the device from the key unit.

The data can, for example, include commands for the machine control, for example shutdown commands or control commands.

The data can also be identification data or authorization data for a user or a person.

The data can also be key data in order, for example, to keep a machine in a non-activated state and to avoid an unsafe start of the machine.

A second kind of respective data that will be explained by way of example in the following is preferably transmitted using the second transmission/reception unit.

In addition to the data for identification, data with respect to the device status and/or device data are transmitted to the key unit. They can in this respect be operating data, process data or similar data. The data are, for example, data on the device status, error messages or data on the operating behavior of the device, for example downtimes of the device. They are, for example, pressure values of a valve.

They can, however, also be acknowledgment data or protocol data of the device that are transmitted to the key unit.

The data can furthermore also be service data or production data that are transmitted to the key unit by the device.

In accordance with the invention, the key unit is carried along by the person to reach the devices. While the person carries along the key unit, the facility can be deactivated, for example.

The transmission of data between the key unit and the device can take place automatically. I.e. if the person has approached the device up to a specific minimum distance, the data of the device will be automatically read by the key unit.

The person who takes along the key unit can optionally transmit the data from the device using the key unit itself or can transmit the data to the device. Provision can be made for this purpose, for example, that an action, for example an actuation of a button at the key unit, has to be carried out by the person, for example. It is thereby ensured that the data of the device are not automatically transmitted by the key unit, but that an active action of the person is always required to transmit the data.

The device can, for example, have a very simple design to provide the data. In the simplest case, the device additionally requires a memory and an apparatus, for example a transmission/reception unit, for the data provision.

A plurality of devices are normally present. A plurality of devices are in particular present with large facilities or large safety zones or with large facilities having a plurality of safety zones. Provision can be made in this respect that the key unit at least transmits data from a device. Provision is, however, in particular also made that a key unit transmits data from a plurality of devices. Provision is in particular made that the key unit transmits data from a plurality of devices in a specific order.

The communication between the key unit and the device can take place unidirectionally or bidirectionally. In the simplest case, a simple reading of the data of the device is sufficient. Provision can, however, also be made that data are written from the key unit to the device.

In a further development of the invention, the first transmission/reception unit has a low range and the second transmission reception unit has a high range.

The low range amounts, for example, to 0 to 1 m, in particular 0 to 500 mm, in particular 0 to 250 mm.

The high range amounts, for example, to 0 to 10 m, in particular 0 to 5 m, or in particular 0 to 2 m.

It is thereby ensured that data can only be transmitted from the device by the first transmission/reception unit when a specific distance from the device is fallen below. It is thereby ensured that specific, already explained data can only be transmitted when it is ensured that the key unit is at a minimum distance from the device. This is sensible, for example, when the operator is himself in the vicinity of the device in order, for example, to observe an effect of an action that has been carried out or of a command that has been carried out.

Data can thereby also not be automatically transmitted by the first transmission/reception unit when the key unit is too far away from the device.

However, a data transmission can be carried out via the second transmission/reception unit, with a high range therefore at a larger distance from the device than with the first transmission/reception unit.

A data transmission can thereby always be carried out via the second transmission/reception unit before it is possible with the first transmission/reception unit when the person having the key unit approaches the device. A data transmission of the first transmission/reception unit can thereby, for example, be prepared by a data transmission of the second transmission/reception unit.

In a further development of the invention, the first channel is configured for the transmission and reception of secure data and the second channel is configured for the transmission and reception of insecure data.

A first kind of respective secure data that will be explained by way of example in the following is preferably transmitted using the first transmission/reception unit.

These data can, for example, be control data for the device that are transmitted to the device from the key unit.

The data can, for example, include commands for the machine control, for example shutdown commands or control commands.

The data can also be identification data or authorization data for a user or a person.

The data can also be key data in order, for example, to keep a machine in a non-activated state and to avoid an unsafe start of the machine.

A second kind of respective insecure data that will be explained by way of example in the following is preferably transmitted using the second transmission/reception unit.

In addition to the data for identification, data with respect to the device status and/or device data are transmitted to the key unit. They can in this respect be operating data, process data or similar data. The data are, for example, data on the device status, error messages or data on the operating behavior of the device, for example downtimes of the device. They are, for example, pressure values of a valve.

They can, however, also be acknowledgment data or protocol data of the device that are transmitted to the key unit.

The data can furthermore also be service data or production data that are transmitted to the key unit by the device.

In a further development of the invention, the first and second transmission/reception units are each an RFID transmission/reception unit.

An RFID transmission/reception unit has an antenna arrangement for communicating with the device that, for example, has an RFID transponder, with the RFID transponder comprising at least one coil for interaction with the antenna arrangement of the RFID transmission/reception unit.

RFID (radio frequency identification) transmission/reception units are used in transmitter/receiver system for the automatic and contactless identification and/or localization of RFID transponders using radio waves. An RFID system typically first comprises the RFID transponder (also called a "tag") that comprises an antenna and that is located at or in the device. As a rule, it comprises a characterizing identification data code that can be interrogated via the antenna arrangement by the RFID reception unit or the RFID reading device of the RFID system (also called a "transceiver"). The RFID transmission/reception unit for this purpose comprises the antenna arrangement and a transceiver circuit (e.g. the EM405 chip of EM Microelectronics) for reading out this code from the RFID transponder. The RFID transmission/reception unit typically generates alternating magnetic fields to transmit signals to the RFID transponder to read out the code from the RFID transponder. The RFID transponder is configured to send back a signal comprising data, in particular the code, as a response to the RFID transmission/reception unit after receipt of a corresponding signal from the RFID transmission/reception unit and the RFID transmission/reception unit evaluates it with the evaluation unit and further processes it.

In RFID systems, the RFID transmission/reception unit generates alternating magnetic fields that are not only provided for transmitting the data, but that can also serve to supply the RFID transponders with energy.

An RFID system thus has the advantage that the RFID transponder does not require its own power supply and ca therefore be used in a flexible manner. The RFID transponder draws its energy via radio waves from the RFID transmission/reception unit. The RFID transponder is addressed via the antenna arrangement of the RFID transmission/reception unit and responds to the RFID transmission/reception unit with a piece of information stored in the RFID transponder. The information transmitted by the transponder of the RFID system is received by the antenna arrangement and can subsequently be evaluated in the evaluation unit. The stored information on the transponder includes at least one code, namely the identification data that identify the RFID transponder.

Since the recognition of the RFID transponder takes place over radio waves, the system is very robust with respect to environmental influences. The RFID transmission/reception unit can therefore be used with the RFID transponder in very rough environments, for example in industrial environments where lubricants are used and where, for example, a high degree of contamination can occur.

Since the recognition of the RFID transponder takes place over radio waves, a line of sight is not necessary between the key unit and the device, unlike an optical solution. The key unit and the device can therefore be completely encapsulated to protect them from harmful environmental influences.

In a further development of the invention, the external device has at least one respective RFID transponder.

In a further development of the invention, the data of the key unit can be transmitted to a key station.

The key station is arranged outside a safety zone, for example. The key station receives the at least one key unit in a receiver. The receiver can be a drawer or a rack, for example. The key station is configured to read out the key unit and to evaluate the data of the key unit in an evaluation unit or to forward it to a system.

Provision is made in a further development of the invention that the key unit or key units can only be removed from the key station by authorized persons. The authorized persons such as operators or service engineers must register at the key station with the aid of an electronic identity card or with the aid of another means of identification, for example, to obtain a key unit. A start code is, for example, transmitted from the key station to the key unit on the removal of the key unit.

The key units can in this respect also be assigned to specific persons so that a specific key unit can only be taken up or taken along by a specific person.

In a further development of the invention, the key station are connectable to an ERP system.

An enterprise resource planning (ERP) system designates a system that has the entrepreneurial task of planning and controlling resources such as capital, personnel, operating means, material, information and communications technology and IT systems in the sense of the purpose of the enterprise in good time and in line with requirements. An efficient operative value creation process and a constantly optimized control of the entrepreneurial and operative routines should be ensured.

A core function of ERP systems in producing enterprises is, for example, material requirement planning that has to ensure that all the materials required for the manufacture of the products and components are available at the right place at the right time and in the right quantity.

An ERP system is a complex system, for example a plurality of mutually communicating pieces of application software or IT systems that are used for supporting resource planning of the total company. Complex ERP systems are frequently divided into part systems, for example application modules, that can be combined with one another in dependence on the company requirements.

In a further development of the invention, the data have a time stamp. When the data are created in the device is thereby ensured. The data can thereby be sorted after one another in time and can be correspondingly evaluated.

An access zone to the device is furthermore optionally provided. The access zone is a spatially bounded access zone having an access station, for example a gate or a door. The safety zone of the facility is only accessible through this access zone. A plurality of access zones can also be arranged. This can in particular be sensible with very large facilities that have a plurality of safety zones, for example.

The access station can, for example, have electronic means such as an electronic door switch, whereby a check can be made whether the access zone has been opened.

The invention will also be explained in the following with respect to further advantages and features with reference to the enclosed drawing and to embodiments. The Figures of the drawing show in:

FIG. 1 a system with a mobile key unit; and

Figure 2:
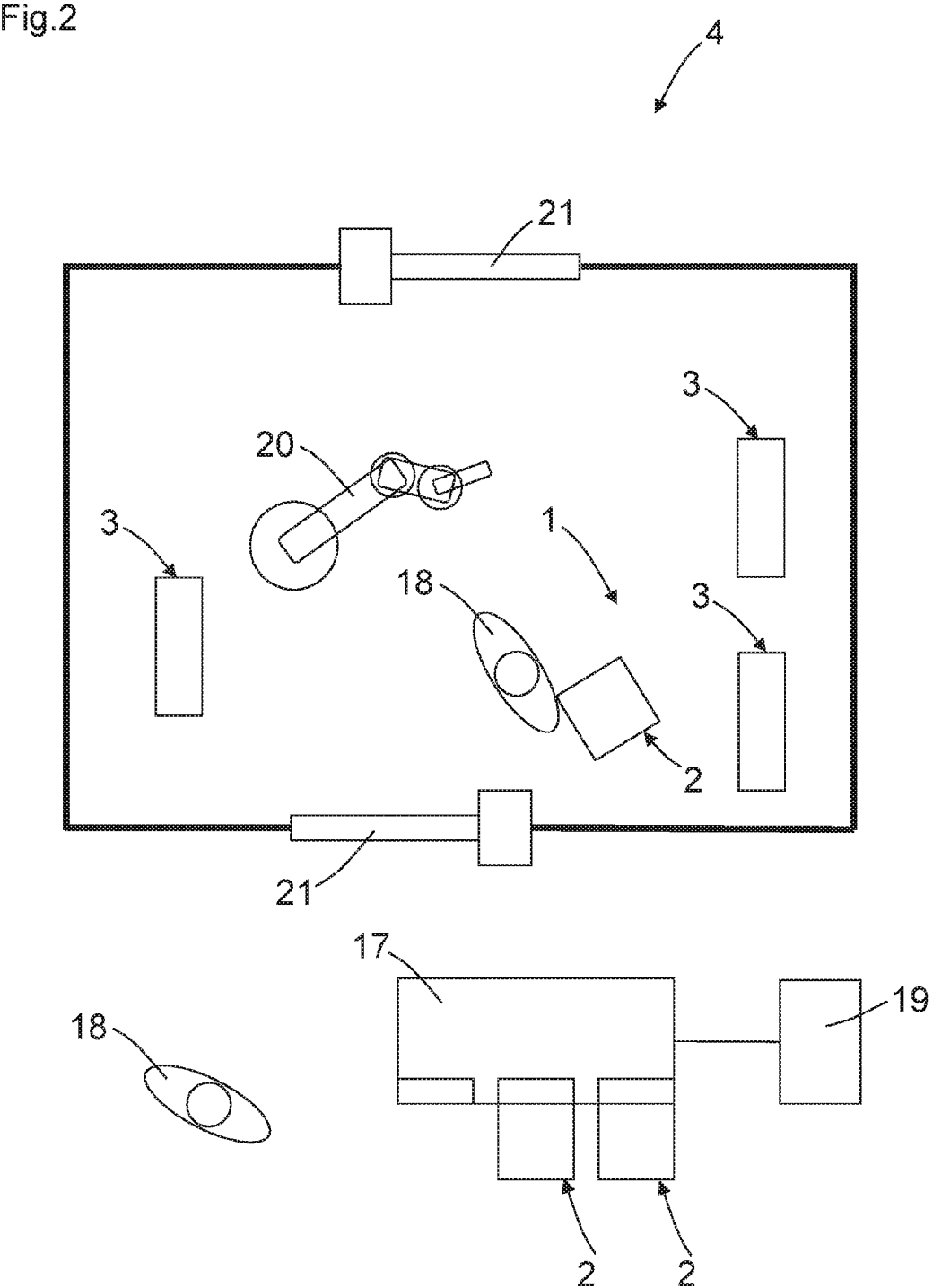

FIG. 2 a system and a facility with a plurality of mobile key units.

In the following Figures, identical parts are provided with identical reference numerals.

FIG. 1 shows a system 1 having a mobile key unit 2 for reading and writing data from at least one external device 3 of a facility 4, wherein the data comprise at least identification data for the device 3 to be checked, and wherein the mobile key unit 2 has a first transmission/reception unit 5 by means of which the data can be transmitted wirelessly between the device 3 and the key unit 2, wherein the key unit 2 has a first memory 6, the key unit 2 has at least one secure channel 7 having a first evaluation unit 8 and the first transmission/reception unit 5 and has at least one second channel 12 having a second evaluation unit 11 and a second transmission/reception unit 10 by means of which data can be wirelessly transferred between the device 3 and the key device 2, wherein the data can be transmitted using at least one of the transmission/reception units 5, 10.

It is, for example, a handy key unit 2 that can be carried or taken along by a person without problem. The key unit 2 optionally has operating elements and optionally at least one display element.

The evaluation units 8 and 13 are formed by a microcontroller, for example. The memory 6 is provided to store data on the key unit. A second memory 11 is optionally provided that is connected to the second evaluation unit 13. It is thereby possible to store data redundantly.

The facility 4 can, for example in accordance with FIG. 2, be an industrial facility for manufacturing products. It is, for example, in this respect a part of a production plant for automobiles. The facility can also be a part of a machine or a facility having a plurality of machines. The facility 4 has a safety zone that may not be entered by persons 18 when the facility is active since the person 18 may be in danger from parts of the facility. The facility is, for example, one or more robots 20 whose dangerous action zone is disposed within the safety zone.

An access zone 21 to the devices 3 is furthermore optionally provided in the facility 4. The access zone 21 is a spatially bounded access zone 21 having an access station, for example a gate or a door. The safety zone of the facility 4 is only accessible through this access zone 21. A plurality of access zones 21 can also be arranged. This can in particular be sensible with very large facilities 4 that have a plurality of safety zones, for example.

The access station can, for example, have electronic means such as an electronic door switch, whereby a check can be made whether the access zone 21 has been opened.

The at least one external device 3 is arranged, for example, within the safety zone. The device or devices 3 are, for example, arranged at a fixed position so that they cannot be removed. They can, however, also be mobile devices 3. The device 3 is integrated in the facility 4, for example.

The device 3 in accordance with FIG. 1 at least contains data for identification that can be wirelessly retrieved from the key unit via the first transmission/reception unit 5 or via the second transmission/reception unit 10. The first transmission/reception unit 5 or the second transmission/reception unit 10 is preferably a radio transmission/reception unit.

The device 3 can, for example, be a valve, an actuator, a sensor or another electrical or electronic device.

A first kind of respective data is preferably transmitted using the first transmission/reception unit 5. These data can, for example, be control data for the device 3 that are transmitted to the device 3 from the key unit 2.

A second kind of respective data is preferably transmitted using the second transmission/reception unit 10. In addition to the data for identification, data with respect to the device status and/or device data are transmitted to the key unit 2.

In accordance with FIG. 2, the key unit is carried along by the person 18 to reach the devices 3. While the person 18 carries along the key unit 2, the facility 4 can be deactivated, for example.

The transmission of data between the key unit 2 and the device 3 can take place automatically. I.e. if the person 18 has approached the device 3 up to a specific minimum distance, the data of the device 3 will be automatically read by the key unit 2.

The person 18 who takes along the key unit 2 can optionally transmit the data from the device 3 using the key unit 2 itself or can transmit the data to the device 3. Provision can be made for this purpose, for example, that an action, for example an actuation of a button at the key unit 2, has to be carried out by the person 18, for example. It is thereby ensured that the data of the device 3 are not automatically transmitted by the key unit 2, but that an active action of the person 18 is always required to transmit the data.

A plurality of devices 3 are typically present in accordance with FIG. 2. A plurality of devices 3 are in particular present with large facilities 4 or large safety zones or with large facilities 4 having a plurality of safety zones. Provision can be made in this respect that the key unit at least transmits data from a device 3. Provision is, however, in particular also made that a key unit 2 transmits data from a plurality of devices 3. Provision is in particular made that the key unit 2 transmits data from a plurality of devices 3 in a specific order.

The communication between the key unit 2 and the device 3 can take place unidirectionally or bidirectionally. In the simplest case, a simple reading of the data of the device 3 is sufficient. Provision can, however, also be made that data are written from the key unit 2 to the device 3.

In accordance with FIG. 1, the first transmission/reception unit 5 has a low range and the second transmission/reception unit 10 has a high range.

Data can thereby not be automatically transmitted by the first transmission/reception unit 5 when the key unit 2 is too far away from the device 3.

However, a data transmission can be carried out via the second transmission/reception unit 10, with a high range therefore at a larger distance from the device 3 than with the first transmission/reception unit 5.

A data transmission can thereby always be carried out via the second transmission/reception unit 10 before it is possible with the first transmission/reception unit 5 when, in accordance with FIG. 2, the person 18 having the key unit 2 approaches the device 3.

In accordance with FIG. 1, the first channel 7 is configured for the transmission and reception of secure data and the second channel 12 is configured for the transmission and reception of insecure data.

A first kind of respective secure data is preferably transmitted using the first transmission/reception unit 5.

These data can, for example, be control data for the device 3 that are transmitted to the device 3 from the key unit 2. The data can, for example, include commands for the machine control, for example shutdown commands or control commands. The data can also be identification data or authorization data for a user or a person 18.

The data can also be key data in order, for example, to keep a machine in a non-activated state and to avoid an unsafe start of the machine.

A second kind of respective insecure data is preferably transmitted using the second transmission/reception unit 10.

In addition to the data for identification, data with respect to the device status and/or device data are transmitted to the key unit 2. They can in this respect be operating data, process data or similar data. The data are, for example, data on the device status, error messages or data on the operating behavior of the device, for example downtimes of the device. They are, for example, pressure values of a valve.

They can, however, also be acknowledgment data or protocol data of the device 3 that are transmitted to the key unit 2. The data can furthermore also be service data or production data that are transmitted to the key unit 2 by the device 3.

In accordance with FIG. 1, the first transmission/reception data 5 and the second transmission/reception data 10 are respectively an RFID transmission/reception unit 15. In accordance with FIG. 1, the external device 3 respectively has an RFID transponder 16.

In accordance with FIG. 2, the data of the key device 2 can be transmitted to a key station 17. The key station 17 is arranged outside a safety zone, for example.

The key station 17 receives the at least one key unit 2 in a receiver 5. The receiver can be a drawer or a rack, for example. The key station 17 is configured to read out the key unit 2 and to evaluate the data of the key unit 2 in an evaluation unit or to forward them to a system.

In accordance with FIG. 2, provision is made that the key unit or units 2 can only be removed from the key station 17 by authorized persons 18. The authorized persons 18 such as operators or service engineers must register at the key station 17 with the aid of an electronic identity card or with the aid of another means of identification, for example, to obtain a key unit 2. A start code is, for example, transmitted from the key station 17 to the key unit 2 on the removal of the key unit 2.

The key units 2 can in this respect also be assigned to different persons 18 so that a specific key unit 2 can only be taken up or taken along by a specific person 18. In accordance with FIG. 2, the key station 17 is connectable to an ERP system 19.

REFERENCE NUMERALS 1 system
2 key unit
3 external device
4 facility
5 first transmission/reception unit
6 first memory
7 first secure channel
8 first evaluation unit
10 second transmission/reception unit
11 second memory
12 second channel
13 second evaluation unit
15 RFID transmission/reception units
16 RFID transponder
17 key station
18 person
19 ERP system
20 robot
21 access zone

The invention claimed is:
1. A system comprising a mobile key unit for reading and writing data from at least one external device of a facility, wherein the data at least comprise identification data for the at least one external device of the facility, wherein the mobile key unit comprises:

- a first transmission/reception unit for wirelessly transmitting the data between the at least one external device of the facility and the mobile key unit, wherein the at least one external device is located within a safety zone of the facility;
- a first memory;
- at least one first secure channel having a first evaluation unit and the first transmission/reception unit; and
- at least one second channel having a second evaluation unit and a second transmission/reception unit for wirelessly transmitting the data between the at least one external device of the facility and the mobile key unit, with the data being able to be transmitted using at least one of the first and second transmission/reception units, wherein the first transmission/reception unit has a lower range than a range of the second transmission/reception unit,
- wherein the mobile key unit is associated with a key station, the mobile key unit being removable from the key station solely by authorized persons, the key station being located within the facility, external to the safety zone.

2. The system in accordance with claim 1, wherein the first secure channel is configured for transmitting and receiving secure data and the second channel is configured for transmitting and receiving insecure data.

3. The system in accordance with claim 1, wherein the first transmission/reception unit and the second transmission/reception unit are each an RFID transmission/reception unit.

4. The system in accordance with claim 1, wherein the at least one external device has a respective at least one RFID transponder.

5. The system in accordance with claim 1, wherein the data have a time stamp.

6. The system in accordance with claim 1, wherein data of the mobile key unit can be transmitted to the key station.

7. The system in accordance with claim 6, wherein the key station is connectable to an enterprise resource planning (ERP) system.

* * * * *